(12) United States Patent
Williams

(10) Patent No.: US 8,403,103 B1
(45) Date of Patent: Mar. 26, 2013

(54) APPARATUS FOR USE IN TURNING STEERABLE VEHICLE WHEELS

(75) Inventor: Daniel E. Williams, Lebanon, IN (US)

(73) Assignee: TRW Automotive U.S. LLC, Livonia, MI (US)

( * ) Notice: Subject to any disclaimer, the term of this patent is extended or adjusted under 35 U.S.C. 154(b) by 5 days.

(21) Appl. No.: 13/241,328

(22) Filed: Sep. 23, 2011

(51) Int. Cl.
*B62D 5/06* (2006.01)

(52) U.S. Cl. ........ 180/421; 180/423; 180/422; 180/441; 180/442; 180/405; 180/403; 60/431

(58) Field of Classification Search ............ 180/421, 180/422, 423, 441, 442, 403, 405; 60/431
See application file for complete search history.

(56) References Cited

U.S. PATENT DOCUMENTS

| | | | |
|---|---|---|---|
| 5,419,128 A * | 5/1995 | Asano et al. | 60/327 |
| 7,364,004 B2 | 4/2008 | Williams | |
| 2011/0094213 A1 * | 4/2011 | Du | 60/327 |

FOREIGN PATENT DOCUMENTS

JP 58214688 12/1983

\* cited by examiner

*Primary Examiner* — Tashiana Adams
*Assistant Examiner* — Marlon Arce
(74) *Attorney, Agent, or Firm* — Tarolli, Sundheim, Covell & Tummino LLP

(57) ABSTRACT

An apparatus (10) for use in turning steerable vehicle wheels (14, 16) includes a hydraulic power steering motor (12). A pump (26) having an outlet port (28) is connected in fluid communication with the power steering motor (12) and operable to supply hydraulic fluid to the power steering motor (12). A continuously variable transmission (50) is connected with the engine of the vehicle and the pump (26). The continuously variable transmission (50) is operable to drive the pump (26) at a first speed when the pressure at the outlet port (28) is at a first pressure. The continuously variable transmission (50) is operable to drive the pump (26) at a second speed when the pressure at the outlet port (28) is at a second pressure different than the first pressure. The first speed at which the pump (26) is driven is greater than the second speed.

14 Claims, 1 Drawing Sheet

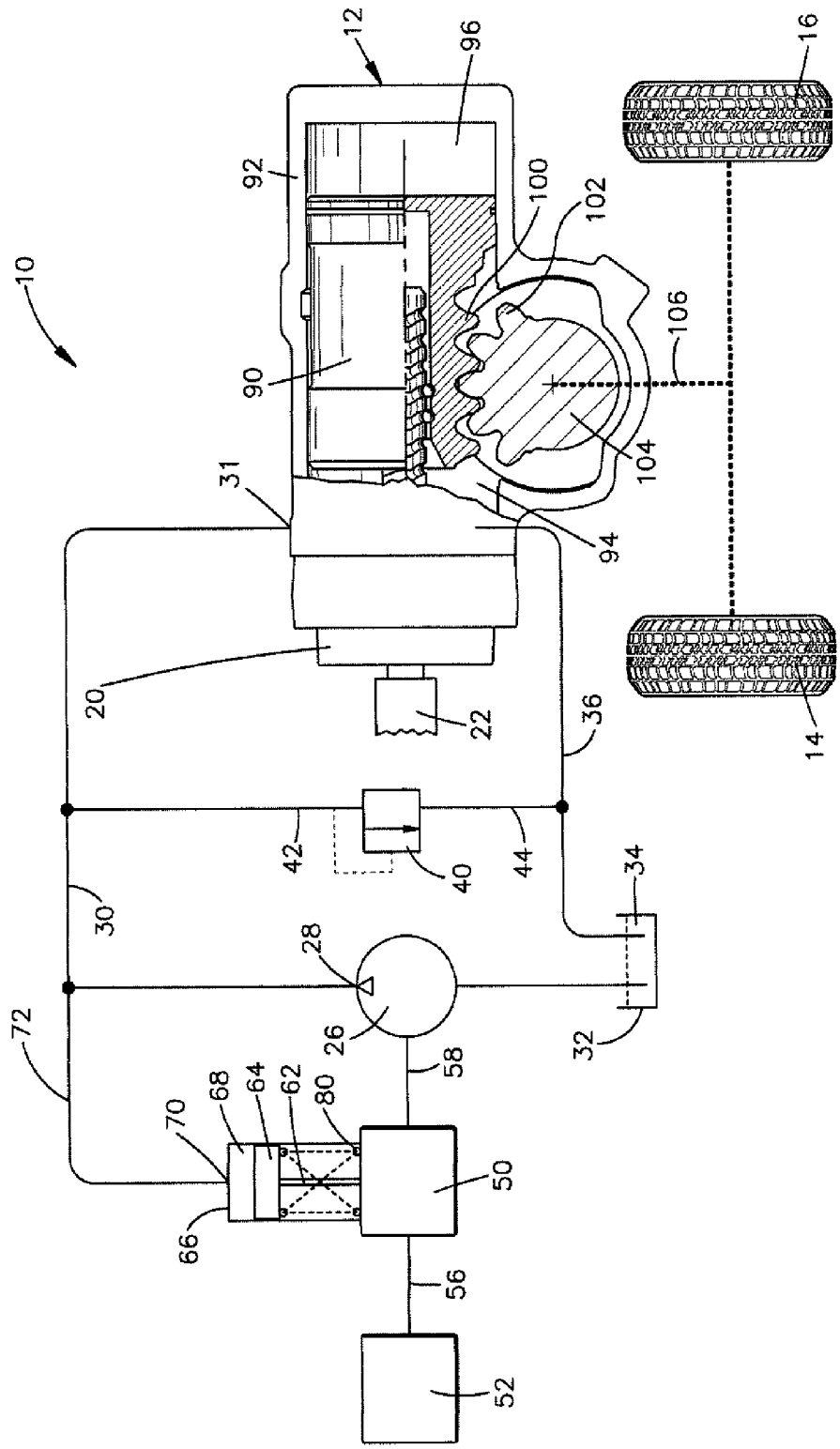

APPARATUS FOR USE IN TURNING STEERABLE VEHICLE WHEELS

BACKGROUND OF THE INVENTION

The present invention relates to an apparatus for use in turning steerable vehicle wheels during operation of a vehicle.

A known apparatus for use in turning steerable vehicle wheels includes a power steering pump. The power steering pump is typically sized to provide maximum rated flow required to dry park a vehicle at engine idle. At highway speeds the engine can operate at two or three times its idle speed. Therefore, the fixed displacement power steering pump may provide excess flow and excess pressure at highway speeds.

Excess flow from the power steering pump is diverted away from a hydraulic steering gear by a flow control valve. Therefore, only the rated flow is received by the hydraulic steering gear. Power consumed by this known system is determined by total flow delivered by the pump as a function of engine speed and the pressure drop of the steering system.

One known power steering system having this general construction is disclosed in U.S. Pat. No. 5,184,693.

SUMMARY OF THE INVENTION

The present invention relates to an apparatus for use in turning steerable vehicle wheels includes a hydraulic power steering motor. A pump having an outlet port is connected in fluid communication with the power steering motor and operable to supply hydraulic fluid to the power steering motor. A continuously variable transmission is connected with the engine of the vehicle and the pump. The continuously variable transmission is operable to drive the pump at a first speed when the pressure at the outlet port is at a first pressure. The continuously variable transmission is operable to drive the pump at a second speed when the pressure at the outlet port is at a second pressure different than the first pressure. The first speed at which the pump is driven is greater than the second speed.

In another aspect of the present invention a vehicle steering system includes a hydraulic power steering gear having a hydraulic motor operatively connectable with steerable vehicle wheels for, when connected with the vehicle wheels, steering the vehicle wheels and a hydraulic fluid reservoir. A fixed displacement pump has an inlet port for fluid communication with said reservoir and an outlet port for fluid communication with said steering gear. A continuously variable transmission for driving the fixed displacement pump includes a first input driven by the vehicle engine and a second input controlled by a pressure at the outlet port of the pump. The first and second inputs cause the fixed displacement pump to be driven at a speed to produce the hydraulic fluid flow for steering the vehicle wheels.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 1 is a schematic illustration of an apparatus for use in turning steerable vehicle wheels constructed in accordance with the present invention.

DESCRIPTION OF AN EXEMPLARY EMBODIMENT

A vehicle steering apparatus 10 includes a hydraulic power steering motor 12 which is connected with steerable vehicle wheels 14 and 16. A steering control valve 20 is connected with the power steering motor 12. The steering control valve 20 has an input shaft 22 which is connected with a manually rotatable vehicle steering wheel. The steering control valve 20 may be an open center control valve.

A pump 26 has an outlet port 28 connected in fluid communication with the steering control valve 20 and power steering motor 12 by a fluid supply conduit 30. The outlet port 28 of the pump 26 is in fluid communication with an inlet port 31 of the control valve 20. The steering control valve 20 and power steering motor 12 are connected with a reservoir 32 containing hydraulic fluid 34 by a fluid return conduit 36. A pressure relief valve 40 is connected with the fluid supply conduit 30 by a conduit 42 and is connected with the fluid return conduit 36 by a conduit 44.

In accordance with one of the features of the invention, a continuously variable transmission (CVT) 50 is connected with an engine 52 of the vehicle and the pump 26. The CVT 50 is connected with the engine 52 of the vehicle by an input shaft 56 which is rotated at a speed which varies as a direct function of variations in operating speed of the engine 52. The CVT 50 is connected with the pump 26 by an output shaft 58.

The CVT 50 includes a linearly displaceable input member 62. The input member 62 controls the transmission gear ratio of the CVT 50. The input member 62 includes a piston 64 in a housing 66. The housing 66 may be a cylinder connected with the CVT 50. The piston 64 partially defines a pressure chamber 68 in the housing 66. As the input member 62 and piston 64 move relative to the housing 66, the transmission gear ratio of the CVT 50 changes.

The housing 66 for the piston 64 includes a fluid inlet port 70 connected with the fluid supply conduit 30 by a conduit 72. The fluid inlet port 70 is in fluid communication with the fluid outlet port 28 of the pump 26 and the inlet port 31 of the control valve 20. The pressure at the fluid outlet port 28 of the pump 26 or the pressure at the inlet port 31 of the valve 20 acts on the piston 64 to move the piston and the input member 62 relative to the housing 66. A spring 80 in the housing 66 urges the piston 64 against the pressure in the chamber 68 and, therefore, against the pressure at the outlet port 28 of the pump 26 or the inlet port 31 of the control valve 20. As the pressure in the chamber 68 increases, the piston 64 moves toward the CVT 50 and the spring 80 to compress the spring. As the pressure in the chamber 68 decreases, the piston 64 moves away from the CVT 50 and the spring 80.

The CVT 50 is operable to drive the pump 26 at a speed which is a function of the pressure at the outlet port 28 of the pump. During operation of the vehicle, the pressure at the outlet port 28 of the pump 26 moves the piston 64 and the input member 62 to provide a desired rate of flow of hydraulic fluid from the pump 26 to the steering control valve 20. When the steering control valve 20 demands a pressure, the gear ratio of the CVT 50 is increased to increase the flow from the pump 26. When the input shaft 22 is rotated at lower engine speeds, the pressure increases at the outlet port 28 of the pump 26 to move the input member 62 and piston 64 relative to the housing 66 and increase the flow of hydraulic fluid to the steering control valve 20. The system is sized so that when maximum pressure is generated at the outlet port 28 of the pump 26, the gear ratio of the CVT 50 is increased by a factor of three so that the pump generates the required flow to the open center control valve 20 at engine idle.

The CVT 50 may be any continuously variable transmission, such as a NuVinci device manufactured by Fallbrook Technologies. The CVT 50 connects the engine driven input shaft 56 with the output shaft 58 which drives the pump 26. The CVT 50 also has a linearly displaceable input member 62 that is acted upon by the pressure at the outlet port 28 of the pump 26. The pressure at the outlet port 28 controls operation of the CVT 50 to change the gear ratio as a function of pressure at the outlet port of the pump. Since the pressure at the outlet port 28 is the same as the pressure at the inlet port 31 of the control valve 20, the pressure at the inlet port 31 also controls the operation of the CVT 50. The pump 26 provides a desired fluid flow and pressure during steering operations at any engine speed.

By utilizing the CVT 50, the normal flow control valve which is utilized to divert excess flow of hydraulic fluid from the pump 26 may be eliminated. By using the CVT 50, the pump 26 is driven at the desired speed to produce a desired flow and pressure without the use of a flow control valve. Elimination of the flow control valve reduces the energy and heat generated by the vehicle steering apparatus 10.

The power steering motor 12 includes a generally cylindrical piston 90 which divides a housing 92 into left and right variable volume chambers 94 and 96. The piston 90 has rack teeth 100 which meshingly engage teeth 102 disposed on a sector shaft 104. The sector shaft 104 is operatively connected through a vehicle steering linkage 106 to the steerable vehicle wheels 14 and 16.

Upon operation of the steering control valve 20 in response to rotation of the input shaft 22, high pressure fluid from the pump 26 flows into one of the chambers 94 and 96. In addition, fluid flows from the other chamber to the reservoir 32 through the steering control valve 20 and fluid return conduit 36.

The steering control valve 20 has a known construction. The steering control valve 20 may include a core member which is disposed inside of a sleeve member. A torsion bar may act between the core member and the sleeve member. The general construction of the steering control valve 20 and the manner in which it cooperates with the power steering motor 12 is similar to the disclosure in U.S. Pat. No. 5,184,693.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for use in turning steerable vehicle wheels comprising:
   a hydraulic power steering motor connected with the steerable vehicle wheels and operable to turn the steerable vehicle wheels,
   a pump having an outlet port connected in fluid communication with said hydraulic power steering motor and operable to supply hydraulic fluid to said hydraulic power steering motor during turning of the steerable vehicle wheels, and
   a continuously variable transmission connected with the engine of the vehicle and with said pump, said continuously variable transmission being operable under the influence of force transmitted from the engine of the vehicle to drive said pump at a first speed when a pressure at said outlet port is at a first pressure, said continuously variable transmission being operable under the influence of force transmitted from the engine to drive said pump at a second speed when the pressure at said outlet port is at a second pressure different than the first pressure, said first speed at which said pump is driven by said continuously variable transmission during a vehicle steering operation is greater than said second speed at which said pump is driven by said continuously variable transmission.

2. An apparatus as set forth in claim 1 wherein said continuously variable transmission includes a linearly displaceable input member for changing the speed at which said pump is driven by said continuously variable transmission.

3. An apparatus as set forth in claim 2 wherein the pressure at said outlet port of said pump acts against a piston, said piston being operable to move said linearly displaceable input member of said continuously variable transmission.

4. An apparatus as set forth in claim 3 wherein a spring urges said piston to move against the pressure at said outlet port of said pump.

5. An apparatus as set forth in claim 3 wherein movement of said piston relative to a housing is transferred to said linearly displaceable input member of said continuously variable transmission.

6. An apparatus as set forth in claim 1 wherein said continuously variable transmission has an output member connected with said pump, a first input member connected with the engine of the vehicle, and a second input member movable in response to changes in the pressure at said outlet port of said pump.

7. An apparatus as set forth in claim 6 further including a piston connected with said second input member of said continuously variable transmission, said piston being movable relative to a housing, said housing having a fluid inlet connected with said outlet port of said pump, the pressure at said outlet port of said pump being operable to effect movement of said piston relative to said housing.

8. A vehicle steering system comprising:
   a hydraulic power steering gear including a hydraulic motor operatively connectable with steerable vehicle wheels for, when connected with the vehicle wheels, steering the vehicle wheels,
   a hydraulic fluid reservoir,
   a fixed displacement pump having an inlet port for fluid communication with said reservoir and an outlet port for fluid communication with said steering gear,
   a continuously variable transmission for driving said fixed displacement pump, said continuously variable transmission including a first input driven by the vehicle engine and a second input controlled by a pressure at said outlet port of said pump, said first and second inputs causing said fixed displacement pump to be driven at a speed to produce the hydraulic fluid flow for steering the vehicle wheels.

9. An apparatus as set forth in claim 8 wherein said second input is a linearly displaceable member for changing the transmission ratio of said continuously variable transmission to change the speed at which said pump is driven by said continuously variable transmission.

10. An apparatus as set forth in claim 9 wherein the pressure at said outlet port of said pump acts against a piston, said piston being connected to said linearly displaceable member of said continuously variable transmission.

11. An apparatus as set forth in claim 10 wherein a spring has a first end engaging said piston to urge said piston against the pressure at said outlet port of said pump.

12. An apparatus as set forth in claim 11 wherein said piston is movable relative to a housing, said housing defining a chamber in fluid communication with said outlet port of said pump, the pressure in said chamber being operable to effect movement of said piston relative to said housing.

13. An apparatus as set forth in claim 12 wherein said housing is connected with said continuously variable transmission.

14. An apparatus as set forth in claim 8 further including an open center control valve for directing hydraulic fluid to said hydraulic motor.

* * * * *